United States Patent
Yeh et al.

(10) Patent No.: US 8,933,902 B2
(45) Date of Patent: Jan. 13, 2015

(54) TOUCH PANEL STRUCTURE, TOUCH AND DISPLAY PANEL STRUCTURE, AND INTEGRATED TOUCH DISPLAY PANEL STRUCTURE HAVING ANTENNA PATTERN AND METHOD OF FORMING TOUCH PANEL HAVING ANTENNA PATTERN

(75) Inventors: Chih-Shan Yeh, Taoyuan County (TW); Yen-Liang Kuo, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 282 days.

(21) Appl. No.: 13/572,709

(22) Filed: Aug. 13, 2012

(65) Prior Publication Data

US 2014/0043248 A1 Feb. 13, 2014

(51) Int. Cl.
*G06F 3/041* (2006.01)

(52) U.S. Cl.
USPC .......................................... 345/173

(58) Field of Classification Search
USPC .......................................... 345/173
See application file for complete search history.

(56) References Cited

U.S. PATENT DOCUMENTS

| 7,928,965 | B2 | 4/2011 | Rosenblatt | |
|---|---|---|---|---|
| 7,973,722 | B1 | 7/2011 | Hill | |
| 8,736,576 | B2 * | 5/2014 | Hayakawa | 345/174 |
| 8,743,086 | B2 * | 6/2014 | Chen et al. | 345/174 |
| 2002/0036621 | A1 * | 3/2002 | Liu et al. | 345/173 |
| 2009/0167699 | A1 * | 7/2009 | Rosenblatt et al. | 345/173 |
| 2011/0151937 | A1 | 6/2011 | Kusuda | |
| 2011/0156967 | A1 | 6/2011 | Oh | |
| 2012/0162953 | A1 | 6/2012 | Wojack | |
| 2012/0182198 | A1 | 7/2012 | Larsen | |
| 2014/0043248 | A1 | 2/2014 | Yeh | |

FOREIGN PATENT DOCUMENTS

| DE | 102013203641 A1 | 9/2013 |
|---|---|---|
| EP | 2219265 A1 | 8/2010 |
| KR | 101170045 B1 | 7/2012 |

OTHER PUBLICATIONS

Office action mailed on May 30, 2014 for the DE application No. 102013209763.8, p. 1-10.
Nokia N8-00 User Guide, issue 2.1, Nokia GmbH, Ratingen, 2011. S, p. 1-130, http://nds1.nokia.com/phones/files/guides/Nokia_N8-00_UG_en.pdf.

* cited by examiner

*Primary Examiner* — Van Chow
(74) *Attorney, Agent, or Firm* — Winston Hsu; Scott Margo (57) ABSTRACT

In a touch panel and display panel structure or an integrated touch display panel structure, an antenna pattern is disposed on a touch module, a display module or an integrated touch display module for an increased distance between the antenna pattern and electronic components below the structure, reducing electromagnetic effect caused by the electronic components and improving the antenna performance. The antenna pattern is arranged at two opposite edges of a top surface of the touch and display module or the integrated touch display module, and also at side surfaces of a housing non-coplanar to the top surface such that the antenna pattern is located outside the displaying area of the display module. Maintaining the effective antenna area and enhancing the working bandwidth of the antenna, the side width of surface of the touch panel and display panel structure or the integrated touch display panel structure is significantly reduced.

29 Claims, 7 Drawing Sheets

TOUCH PANEL STRUCTURE, TOUCH AND DISPLAY PANEL STRUCTURE, AND INTEGRATED TOUCH DISPLAY PANEL STRUCTURE HAVING ANTENNA PATTERN AND METHOD OF FORMING TOUCH PANEL HAVING ANTENNA PATTERN

BACKGROUND OF THE INVENTION

1. Field of the Invention

The invention relates to a touch panel structure, a touch and display panel structure, and an integrated touch display panel structure having antenna pattern and method of forming the touch panel having such antenna pattern, and more particularly, to such structure that has the antenna pattern disposed away from the back cover of a handheld device and method of forming the touch panel having the antenna pattern.

2. Description of the Prior Art

Antenna is used for transmitting or receiving radio-frequency (RF) signals so that data in the form of radio signals may be conveyed. For electronic products with wireless local area network (WLAN) communication function such as the laptop computers or tablet computers, a built-in antenna is necessary for transmission of data through the wireless network. The advancement of technology in radio communication has led to wireless communication system operating in various distinct frequencies. For example, The Institute of Electrical and Electronics Engineers (IEEE) has regulated the wireless local area network standard IEEE 802.11a with the carrier central frequency at roughly around 5 GHz, while the IEEE 802.11b has the carrier central frequency at roughly around 2.4 GHz. For still another current technology, the Near-field communication (NFC) has the carrier central frequency at 13.56 MHz. To facilitate a user a much more convenient access to various wireless communication networks, an ideal antenna design has to be more flexible to be adapted to frequency band for different wireless communication networks. Additionally, to fit into a mobile device with trendy miniaturized size, the design of the antenna should also consider the smallness of it size as well.

Now that the size of a mobile phone is getting smaller, an old-fashioned antenna structure that protrudes from the housing of the device is strange, leading to a modern design with the antenna taking a form of plate-like antenna and built in the housing of the device. An antenna utilizes electromagnetic waves travelling in the space to transmit or receive messages and is easily interfered by any undesired electromagnetic waves. Since a mobile phone contains many other electronic components, each inevitably radiating electromagnetic waves during its operation, these radiated electromagnetic waves interfere, more or less, the operation of the antenna. As a result, some mobile phones have designs that shield these waves radiated from those electronic components, which interferes the operation of the antenna, looking for reducing such unwelcomed interference by the leaking electromagnetic waves. Generally, such design requires restricting the configuration of the antenna at the housing, the antenna being squeezed either at a single side or at the corner of the housing, and apparently limits the freedom of the layout and design of the antenna, not to mention the ability of the antenna to transmit and receive the signals. Secondly, since the antenna (an NFC antenna for example) is usually disposed at the back cover of the device, the transmission of the antenna may be influenced if the device uses a metallic back cover. Conventionally, a flexible printed circuit (PCB) or an electroplating film may be attached on a plastic piece to form the antenna structure and then the antenna structure is assembled to the back cover of the phone. Additionally, it is obvious that not every electronic component of the device is shieldable with a metallic housing or other wave-absorptive or magnetic material. The touch panel is one of such components, which is required to be touched by a user and is impossible to be fully shielded. Leak of electromagnetic waves from such components and interference to the antenna can not be prevented. Still one more problem is that the increasing size of the touch panel leaves little room for the antenna, which worsens all the aforesaid problems.

Hence, it is a primary objective to effectively enhance the bandwidth of the antenna while meeting the room limitation of a miniaturizing mobile device.

SUMMARY OF THE INVENTION

Hence, the application aims to provide a touch panel structure, a touch and display panel structure, an integrated touch display panel structure having antenna pattern, and method of forming the touch panel with antenna pattern, to make substantial improvement in enhancing the antenna and reducing the electromagnetic interference by the arrangement of the antenna pattern and the electrical components with increased distance therebetween.

A touch panel structure having antenna pattern is provided. The touch panel structure includes a housing, a touch module disposed in the housing, a carrier disposed on the touch module, and an antenna pattern disposed on the carrier. The carrier includes a first section set and a second section set, wherein the first section set and the second section set connect to each other, the first section set lies on a top surface of the touch module, and the second section set is located on a side surface of the housing. The antenna pattern forms a loop antenna on the carrier along the first section set and the second section set.

A touch and display panel structure having antenna pattern is also provided. The touch and display panel structure includes a housing, a display module disposed in the housing, a touch module disposed on the display module, a carrier disposed on the touch module, and an antenna pattern disposed on the carrier. The carrier includes a first section set and a second section set, wherein the first section set and the second section set connect to each other, the first section set lies on a top surface of the touch module, and the second section set is located on a side surface of the housing. The antenna pattern forms a loop antenna on the carrier along the first section set and the second section set.

A touch display panel structure having antenna pattern is also provided. The touch display structure includes a housing, an integrated touch display module disposed in the housing, a carrier disposed on the integrated touch display module, and an antenna pattern disposed on the carrier. The carrier includes a first section set and a second section set, wherein the first section set and the second section set connect to each other, the first section set lies on a top surface of the integrated touch display module, and the second section set is located on a side surface of the housing.

A method of forming a touch panel having antenna pattern is also provided. The touch panel includes a housing, a touch module, a carrier, and an antenna pattern. The carrier includes a first section set and a second section set wherein the first section set and the second section set connect to each other. The method includes following steps: disposing the touch module in the housing; disposing the first section set of the carrier on a top surface of the touch module and the second section set of the carrier on a side surface of the housing; and disposing the antenna pattern on the carrier to form a loop antenna along the first section set and the second set.

The touch panel structure, touch and display panel structure, or the integrated touch display panel structure and the method of forming the same disposes the first section set of the carrier on the top surface of the touch module or the display module and disposes the second section set of the carrier on the side surfaces of the housing. In such way, the antenna pattern disposed on the carrier occupies less area from the top surface of the electronic device. The overall size of the top plane of the electronic device may be closer to the viewable area of the display module, while the effective antenna area of the antenna is maintained and the working range of the antenna may be enhanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
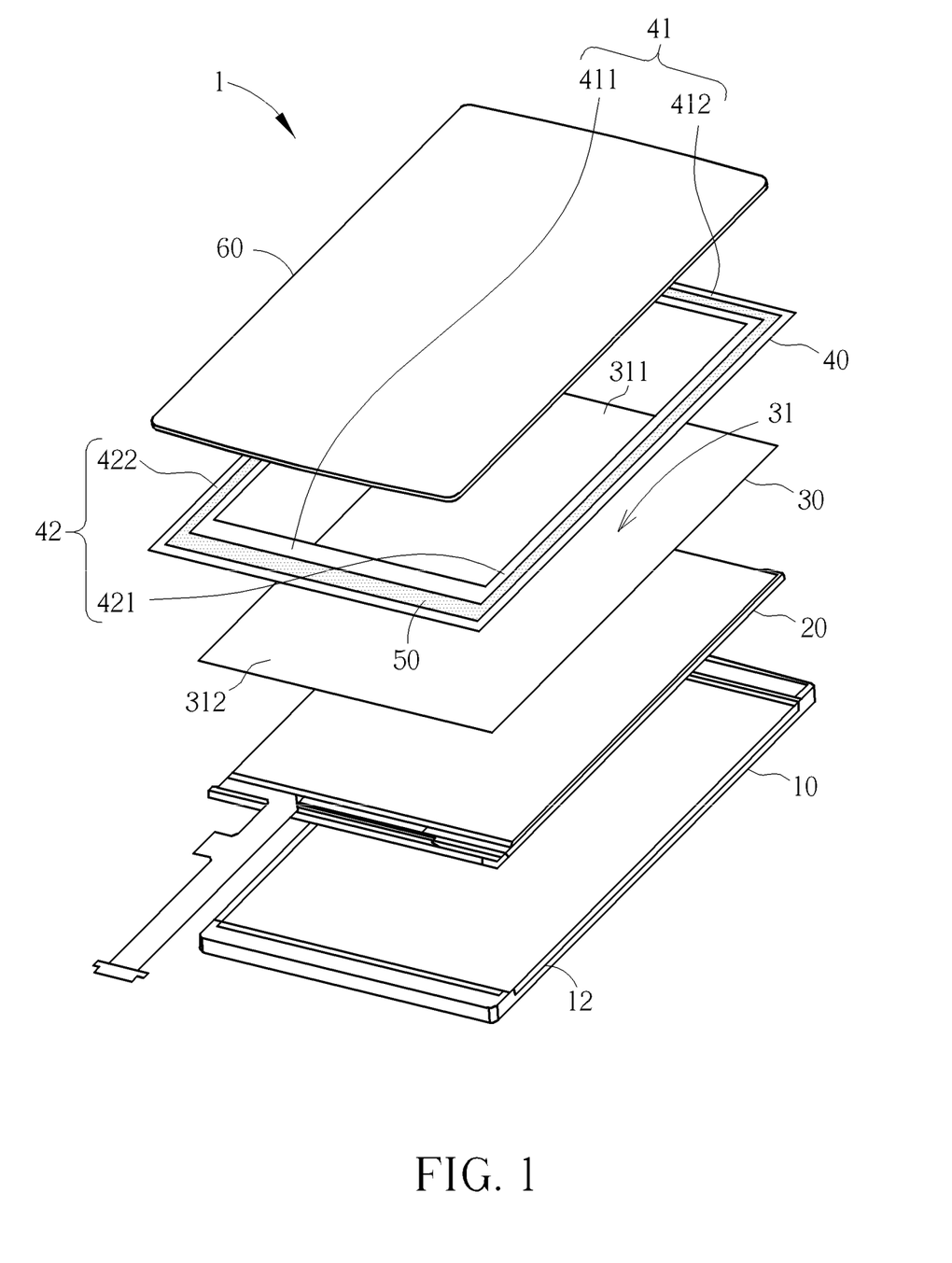
FIG. 1 is an illustration of one of the embodiments of the invention that shows an exploded view of a touch and display panel structure.

Please refer to FIG. 1. FIG. 1 is an illustration of one of the embodiments of the invention that shows a touch and display panel structure (or a touch panel structure) having antenna pattern. The touch and display panel structure 1 is used in a portable electronic device or a communication device, which may be, but not limited to, a smart phone, a personal digital assistant (PDA), a tablet computer, etc. The touch and display panel structure 1 includes a housing 10, a display module 20, a touch module 30, a carrier 40, and a cover lens 60. The housing 10 is a housing or part of the housing of the portable electronic device or the communication device. The touch module 30 includes touch sensor unit composed by at least a plurality of touch sensors, an Indium Tin Oxide layer, etc. The display module 20 is disposed in the housing 10, whereas the touch module 30 is disposed on the display module 20. The touch and display panel structure 1 further includes an antenna pattern 50 disposed on the carrier 40, which may be formed or lied on a surface of the carrier 40 and adhered with a transparent layer. In the application, the antenna pattern 50 is preferably printed on the carrier 40 via electroplating or as a form of Indium Tin Oxide (ITO). The carrier 40 may be a thin film or a flexible printed circuit (FPC) board and additionally, the touch module 30 and the display module 20 may also be formed as an integrated touch display module.

Referring to FIG. 1, the carrier 40 includes a first section set 41 and a second section set 42, in which the first section set 41 includes first sections 411, 412 and the second section set 42 includes second sections 421, 422. The first section set 41 and the second section set 42 connect to each other and form a closed hollow rectangular frame. The antenna pattern 50 is disposed on the carrier 40 and forms a closed loop antenna along the first section set 41 and the second section set 42 in order. A loop antenna is a conductor usually closely coiled as a circular, rectangular, or triangular curve on a plane surface and has a resemblance of working principle as a dipole antenna. The loop antenna is a resonance antenna, too, which has the feature of low profile in need of less room for deployment. Additionally, the antenna pattern 50 is a near field communication antenna such as a Near Field Communication (NFC) antenna or a Radio Frequency Identity (RFID) antenna, whose frequency band falls between 10~20 MHz with a preferred trans/receive one in 13.56 MHz. For the carrier 40 and the antenna pattern 50 thereon integrated in the touch module 30 (the touch display module that further integrates the display module 20), since the antenna pattern 50 is disposed above the touch module 30, sandwiched between the touch module 30 and the cover lens 60 to be more specific, the antenna pattern 50 is far more distanced from the electronic components down beneath, which may substantially reduce the electromagnetic effect caused by the electronic components and hence a ferrite sheet can no longer be needed to reduce cost of manufacture. On the other hand, the technique disclosed in the embodiment of the invention also avoids the antenna pattern 50 from blocking the displaying area of the display module 20, while increasing the area required by the antenna pattern 50 (the effective resonance length) to improve the antenna performance and the working bandwidth of the antenna. It needs to be noted that besides forming the antenna pattern 50 on the surface of the carrier 40 by printing, the antenna pattern 50 may also be firstly formed on a thin film via particular technique such as the Laser Direct Structuring (LDS), electroplating or chemical plating designated thickness and electrical characteristics of the metallic film. Any technology that can be used to form the antenna pattern 50 on the carrier 40 falls within the scope of the application.

Figure 2:
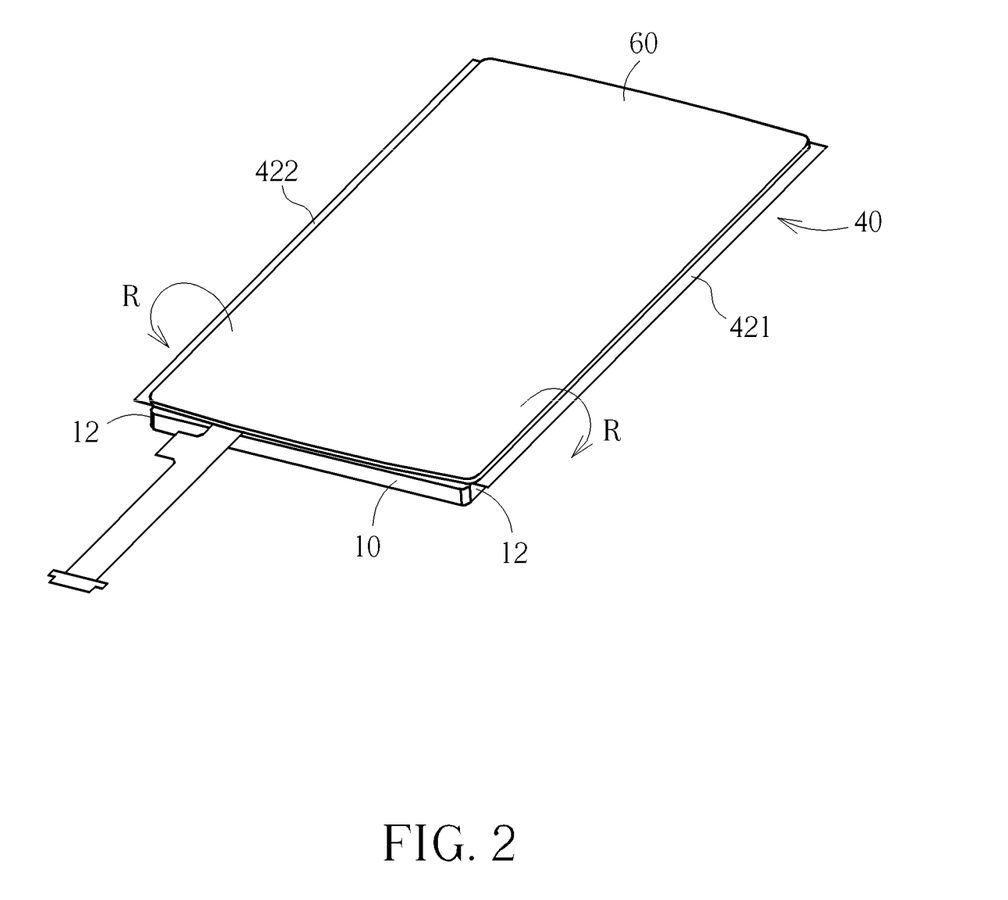
FIG. 2 is an illustration showing the touch and display panel structure in progress of assembling.
Figure 3:
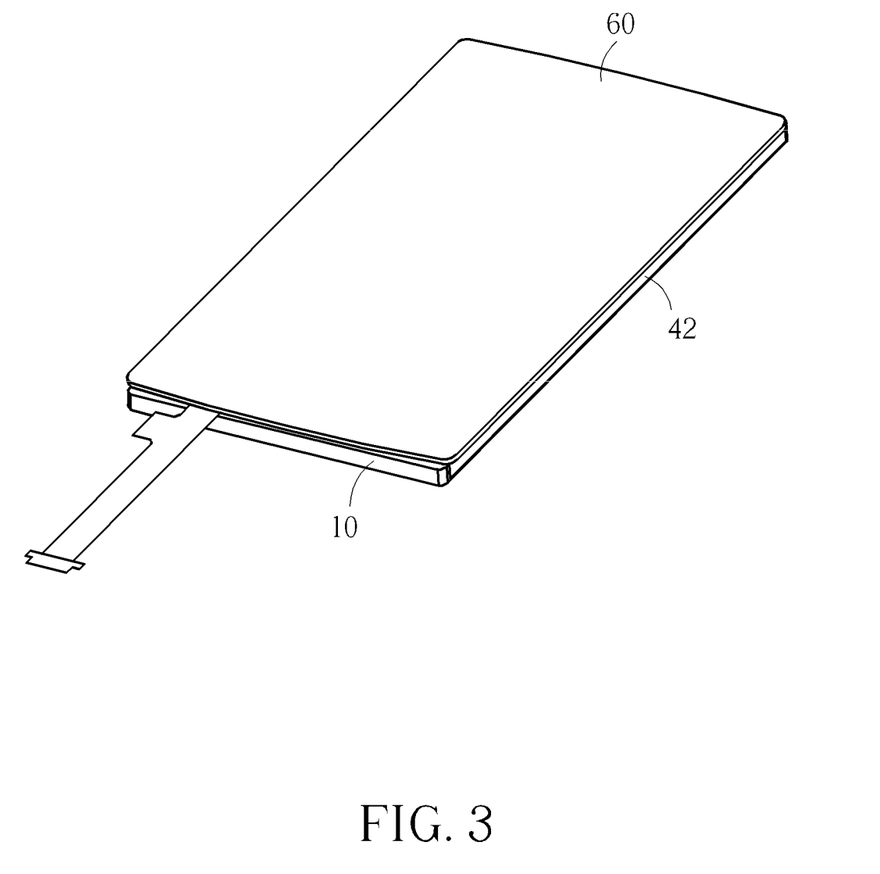
FIG. 3 is an illustration showing completion of the assembly of the touch and display panel structure.

Please refer to FIG. 2 and FIG. 3. FIG. 2 is an illustration showing the touch and display panel structure in progress of assembling and FIG. 3 is an illustration showing completion of the assembly of the touch and display panel structure. In the embodiments of the invention, the touch and display panel structure 1 not only has its antenna pattern 50 configured to be placed remotely from the electronic components of the electronic device but places a featured design between the structure of the cover lens 60 and the touch module 30 in such a way to avoid the antenna pattern 50 from blocking the displaying area of the display module 20, drawing the overall size of the electronic device closer to the displaying area of the display module 20 while the area (the effective resonance route) of the antenna pattern 50 is maintained for improving the antenna with an increased working bandwidth. Please also refer to FIG. 1. As the carrier 40 and the antenna pattern 50 are sandwiched between the touch module 30 and the cover lens 60, the first section set 41 of the carrier 40 is disposed above/ on a top surface 31 of the touch module 30 whereas the second section set 42 extends out of the top surface 31 of the touch module 30 as shown in FIG. 2. From FIG. 2, the antenna pattern 50 can be shown to have a design with coverage area larger than the display module 20 and the effective resonance route may be increased. The two second sections 421, 422 of the second section set 42 of the carrier bend along direction R at both sides of the housing 10 and are located right on two side surfaces 12 of the housing 10 as shown in FIG. 3. It can be understood that the two second sections 421, 422 may also be further extended from the side surfaces 12 along direction R to be attached to a back surface of the housing 10, which is now shown in the figures due to the view angle, to be more extensively adapted for various types of antenna designs and operation bands.

Figure 4:
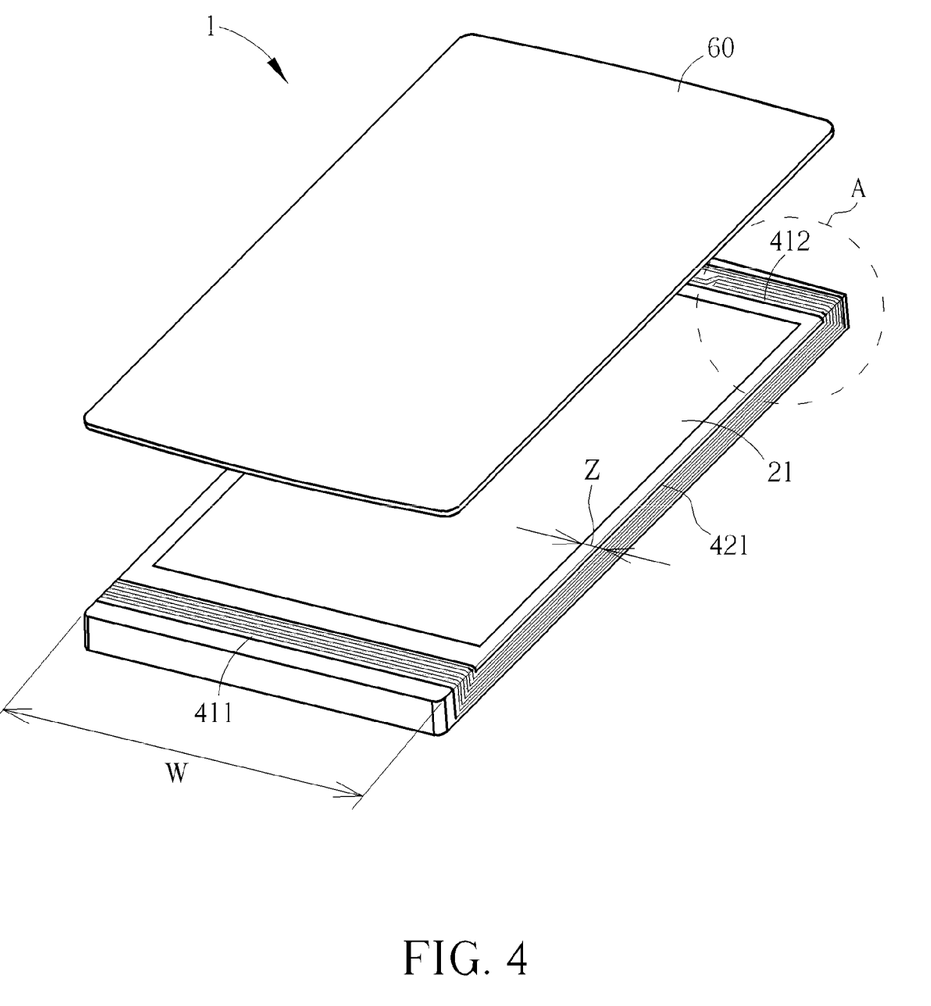
FIG. 4 is an illustration of the touch and display panel structure in part.
Figure 5:
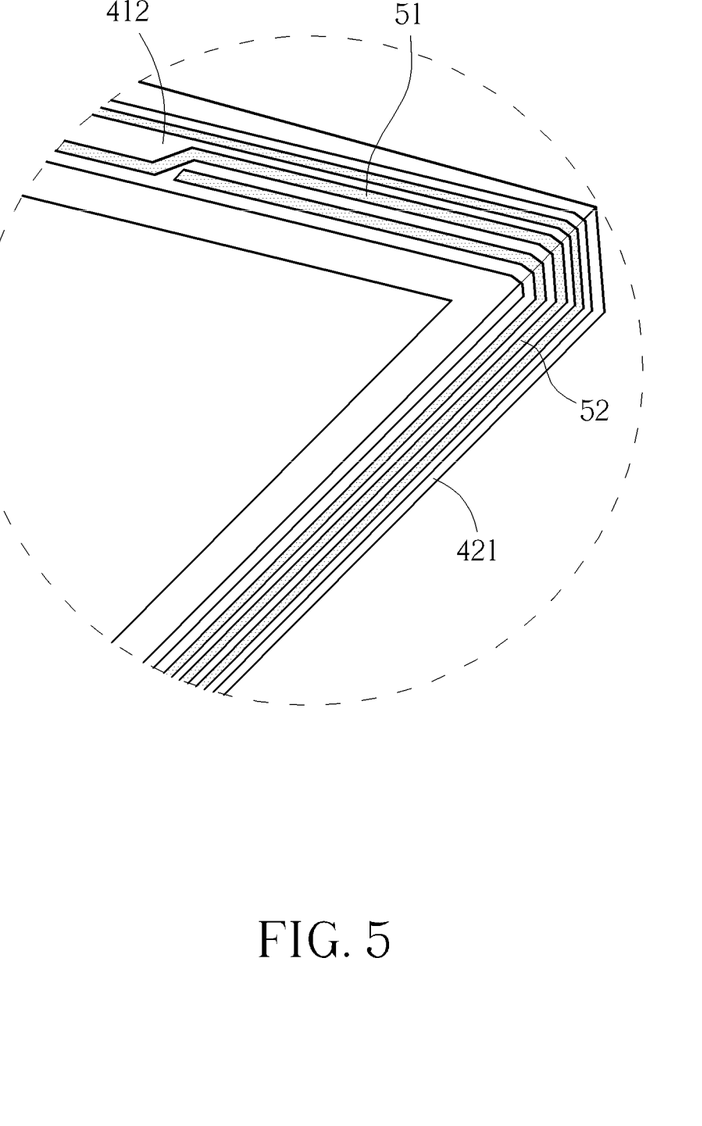
FIG. 5 is an illustration of a partially enlarged view of the touch and display panel structure in FIG. 4.

Please refer to FIG. 4 and FIG. 5. FIG. 4 is an illustration of the touch and display panel structure in part and FIG. 5 is an illustration of a partially enlarged view of an area A in FIG. 4. As described previously, the second section set 42 of the carrier 40 is located at the side surfaces 12 of the housing 10, which is served as the carrying housing for containing and covering most parts of the touch and display panel structure 1. The side surfaces 12 are substantially perpendicular or forming a non-coplanar angle with the top surface 31 of the touch module 30. As the second section set 42 of the carrier 40 is attached and located on the side surfaces 12 of the housing 10, either inner sides or outer sides, the second section set 42 has non-coplanar relation with the first section set 41. In FIG. 5 and preferably, the second section 421 of the carrier 40 is perpendicular to the first section 412 and the second section set 42 may also have a non-coplanar and parallel structural relation with the first section set 41 as the second section set 42 reaches to the back surface of the housing 10. In such way, a first segment 51 and a second segment 52 of the antenna pattern 50 are also perpendicular to each other.

For a structure like one mentioned above, the antenna pattern 50 as a loop antenna starts its signal feeding end at the first section 411 on the carrier 40, then coming along the second section 421 vertically on the side surface 12 of the housing 10, back to the top surface 31 of the touch module 30 along the first section 412, then vertically extending along the other side surface 12 of the housing 10, and finally back to the first section 411 on the top surface 31 of the touch module 30, which is implemented as a ground end or the other feeding end. The two first sections 411, 412 of the first section set 41 of the carrier 40 are respectively located at two opposite edges 311, 312 of the top surface 31 of the touch module 30. For a completely assembled touch and display panel structure 1, the antenna pattern 50 only has its first segment 51 lied on the top surface 31 of the touch module 30 whereas the second segment 52 of the antenna pattern 50 is perpendicularly (or in a non-coplanar way) located on the side surface 12 of the housing 10. Since the antenna pattern 50 is disposed outside the displaying area of the display module 20, the side width Z of the touch and display panel structure 1 is reduced to a maximum extent, bringing the width W of the touch and display panel structure 1 closer to the displaying area 21.

Figure 6:
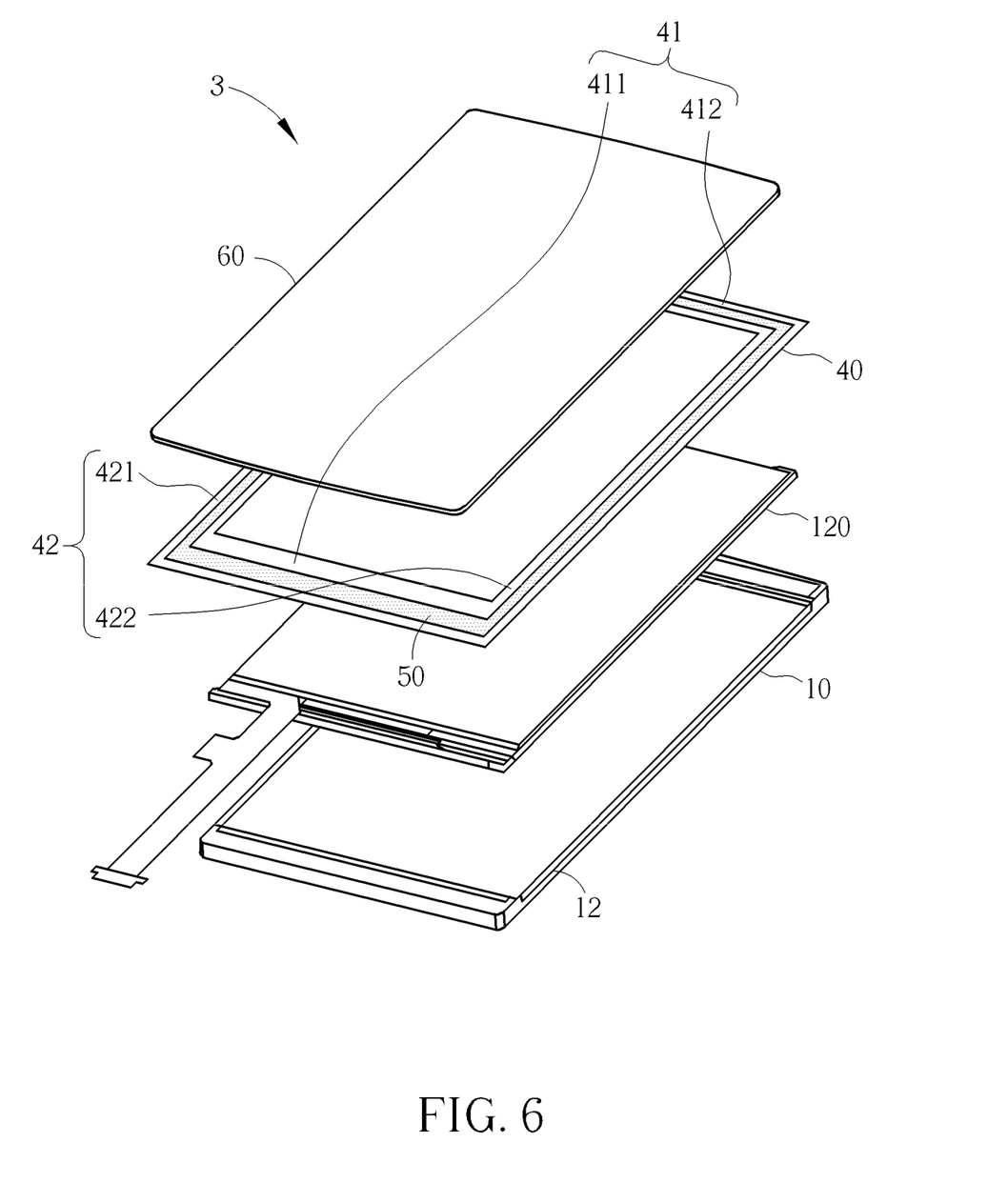
FIG. 6 is an illustration of one of the embodiments of the invention that shows an exploded view of an integrated touch display panel structure.

Please refer to FIG. 6. FIG. 6 is an illustration of one of the embodiments of the invention that shows an exploded view of an integrated touch display panel structure (in-cell or on-cell). As previous description, the touch module 30 and the display module 20 may also be integrated as a touch display module whereas the antenna pattern is applied on such integrated touch display panel structure 3. Similarly, the integrated touch display panel structure 3 includes a housing 10, an integrated touch display module 120, a carrier 40, an antenna pattern 50, and a cover lens 60. The housing 10 is a housing or part of the housing of the portable electronic device or the communication device. The integrated touch display module 120 is disposed in the housing 10, whereas the carrier 40 is disposed on the integrated touch display module 120 and the antenna pattern 50 is disposed on the carrier 40, which may be formed on a surface of the carrier 40 and adhered with a transparent layer. In the application, the antenna pattern 50 is preferably printed on the carrier 40 via electroplating or as a form of Indium Tin Oxide (ITO). The carrier 40 may be a thin film or a flexible printed circuit (FPC) board. Likewise, the carrier 40 includes a first section set 41 and a second section set 42 connected to each other and form a closed hollow rectangular frame. In the embodiment in FIG. 6, the carrier 40 is sandwiched between the integrated touch display module 120 and the cover lens 60. The structural relations between the components and how the carrier 40 is disposed on the integrated touch display module 120 and the housing 10 are similar to the previous embodiment.

Figure 7:
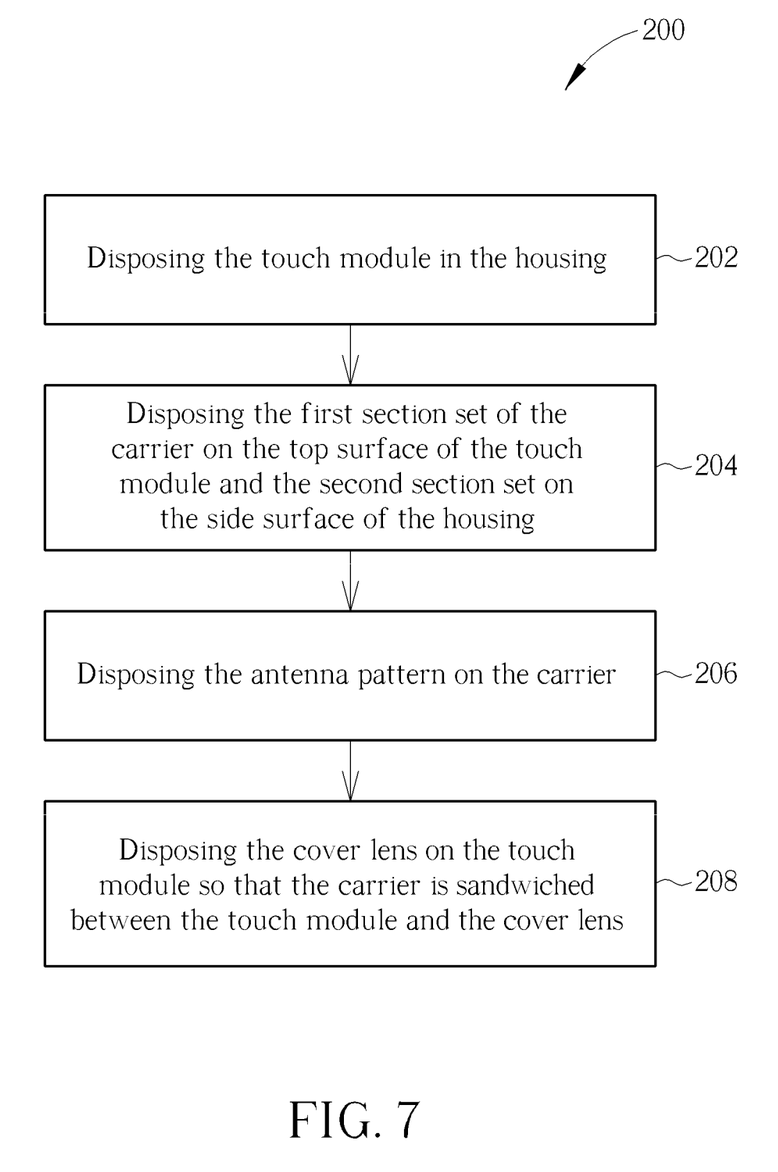
FIG. 7 is an illustration showing a flow chart of a method of forming a touch panel having antenna pattern.

Please refer to FIG. 7, which is an illustration showing a flow chart of a method 200 of forming a touch panel having antenna pattern. The method 200 includes the following steps:

Step 202: Disposing the touch module 30 in the housing 10;

Step 204: Disposing the first section set 41 of the carrier 40 on the top surface 31 of the touch module 30 and the second section set 42 on the side surface 12 of the housing 10;

Step 206: Disposing the antenna pattern 50 on the carrier 40 to form a closed loop antenna along the first section set and the second section set;

Step 208: Disposing the cover lens 60 on the touch module 30 so that the carrier 40 is sandwiched between the touch module 30 and the cover lens 60.

In Step 204, the first section set 41 of the carrier 40 is disposed on the top surface 31, more specifically, on the two opposite edges of the top surface 31 of the touch module 30, and the second section set 42 is disposed on the side surfaces 12 of the housing 10, or further disposed on the back surface of the housing 10. In Step 206, to dispose the antenna pattern 50 on the carrier 40, the antenna pattern 50 may be printed on the carrier 40 via electroplating or as a form of Indium Tin Oxide (ITO).

In Step 202, the display module 20 may be disposed in the housing 10 first and then the touch module 30 is disposed on the display module 20 so that a touch and display panel structure may be formed by the display module 20 and the touch module 30. It can also be implemented in Step 202 by directly disposing an integrated touch display module in the housing 10 and then proceed with the following steps.

The embodiments of described above provide structures that form the antenna pattern above the touch module, the display module or the integrated touch display module such that the distance between the antenna pattern and electronic components below the structure is increased, which reduces electromagnetic effect caused by the electronic components and improves the antenna performance. Secondly, the antenna pattern is arranged at the two opposite edges of the top surface of the touch and display module or the integrated touch display module, and also at side surfaces of the housing non-planar to the top surface such that the antenna pattern is located outside the displaying area of the display module. Maintaining the effective antenna area and enhancing the working bandwidth of the antenna, the side width of surface of the touch panel and display panel structure or the integrated touch display panel structure is significantly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel structure having antenna pattern, comprising:

a housing;

a touch module disposed in the housing;

a carrier disposed on the touch module, comprising a first section set and a second section set, wherein the first section set and the second section set connect to each other, the first section set is located on a top surface of the touch module, and the second section set is located on a side surface of the housing, wherein the side surface of the housing is structurally perpendicular to the top surface of the touch module, and the second section set and the first section set are perpendicular to each other; and an antenna pattern disposed on the carrier, the antenna pattern forming a loop antenna along the first section set and the second section set in order on the carrier.

2. The touch panel structure of claim 1, wherein the antenna pattern is printed on the carrier via electroplating or as a form of Indium Tin Oxide (ITO).

3. The touch panel structure of claim 1, further comprising a cover lens disposed on the touch module, wherein the carrier is sandwiched between the touch module and the cover lens.

4. The touch panel structure of claim 1, wherein the carrier is a thin film or a flexible printed circuit (FPC) board.

5. The touch panel structure of claim 1, wherein the first section set of the carrier is located at two opposite edges of the top surface of the touch module.

6. The touch panel structure of claim 1, further comprising a display module disposed in the housing, wherein the touch module is disposed on the display module.

7. The touch panel structure of claim 1, wherein the second section set is further located on the side surface and a back surface of the housing.

8. The touch panel structure of claim 1, wherein the second section set and the first section set are perpendicular and parallel with each other.

9. A touch and display panel structure having antenna pattern, comprising:
a housing;
a display module disposed in the housing;
a touch module disposed on the display module;
a carrier disposed on the touch module, comprising a first section set and a second section set, wherein the first section set and the second section set connect to each other, the first section set is located on a top surface of the touch module, and the second section set is located on a side surface of the housing, wherein the side surface of the housing is structurally perpendicular to the top surface of the touch module, and the second section set and the first section set are perpendicular to each other; and
an antenna pattern disposed on the carrier, the antenna pattern forming a loop antenna along the first section set and the second section set in order on the carrier.

10. The touch and display panel structure of claim 9, wherein the antenna pattern is printed on the carrier via electroplating or as a form of Indium Tin Oxide (ITO).

11. The touch and display panel structure of claim 9, further comprising a cover lens disposed on the touch module, wherein the carrier is sandwiched between the touch module and the cover lens.

12. The touch and display panel structure of claim 9, wherein the carrier is a thin film or a flexible printed circuit (FPC) board.

13. The touch and display panel structure of claim 9, wherein the first section set of the carrier is located at two opposite edges of the top surface of the touch module.

14. The touch and display panel structure of claim 9, wherein the second section set is further located on the side surface and a back surface of the housing.

15. The touch and display panel structure of claim 9, wherein the second section set and the first section set are perpendicular and parallel with each other.

16. A touch display panel structure having antenna pattern, comprising:
a housing;
an integrated touch display module disposed in the housing;
a carrier disposed on the integrated touch display module, comprising a first section set and a second section set, wherein the first section set and the second section set connect to each other, the first section set is located on a top surface of the integrated touch display module, and the second section set is located on a side surface of the housing, wherein the side surface of the housing is perpendicular to the top surface of the integrated touch display module, and the second section set and the first section set are perpendicular to each other; and
an antenna pattern disposed on the carrier.

17. The touch display panel structure of claim 16, wherein the antenna pattern is printed on the carrier via electroplating or as a form of Indium Tin Oxide (ITO).

18. The touch display panel structure of claim 16, further comprising a cover lens disposed on the integrated touch display module, wherein the carrier is sandwiched between the integrated touch display module and the cover lens.

19. The touch display panel structure of claim 16, wherein the carrier is a thin film or a flexible printed circuit (FPC) board.

20. The touch display panel structure of claim 16, wherein the first section set of the carrier is located at two opposite edges outside a viewable area of the top surface of the integrated touch display module.

21. The touch display panel structure of claim 16, wherein the the second section set is located on the side surface and a back surface of the housing.

22. The touch display panel structure of claim 16, wherein the second section set and the first section set are perpendicular and parallel with each other.

23. A method of forming a touch panel having antenna pattern, the touch panel comprising a housing, a touch module, a carrier, and an antenna pattern, the carrier comprising a first section set and a second section set wherein the first section set and the second section set connect to each other, the method comprising following steps:
disposing the touch module in the housing;
disposing the first section set of the carrier on a top surface of the touch module and the second section set of the carrier on a side surface of the housing, wherein the side surface of the housing is structurally perpendicular to the top surface of the touch module; and
disposing the antenna pattern on the carrier to form a loop antenna along the first section set and the second set in order.

24. The method of claim 23, wherein disposing the antenna pattern on the carrier is printing the antenna pattern on the carrier via electroplating or as a form of Indium Tin Oxide (ITO).

25. The method of claim 23, wherein the touch panel further comprises a cover lens, the method further comprising step: disposing the cover lens on the touch module so that the carrier is sandwiched between the touch module and the cover lens.

26. The method of claim 23, wherein disposing the first section set of the carrier on the top surface of the touch module further disposing the first section set at two opposite edges of the top surface of the touch module.

27. The method of claim 23, wherein the touch panel further comprises a display module, the method further comprising step: disposing the display module in the housing and disposing the touch module on the display module.

28. The method of claim 23, wherein disposing the second section set on the side surface of the housing further comprises step: disposing the second section set on the side surface and a back surface of the housing.

29. The method of claim 23, wherein the second section set and the first section set are perpendicular and parallel with each other.

\* \* \* \* \*